(12) United States Patent
Chludek

(10) Patent No.: US 6,484,859 B2
(45) Date of Patent: Nov. 26, 2002

(54) SHAFT COUPLING WITH A DAMPENING DEVICE

(75) Inventor: Adrian Chludek, St. Augustin (DE)

(73) Assignee: GKN Viscodrive GmbH, Hohmar (DE)

( * ) Notice: Subject to any disclaimer, the term of this patent is extended or adjusted under 35 U.S.C. 154(b) by 0 days.

(21) Appl. No.: 09/780,244

(22) Filed: Feb. 10, 2001

(65) Prior Publication Data

US 2002/0157915 A1 Oct. 31, 2002

Related U.S. Application Data

(62) Division of application No. 09/320,293, filed on May 26, 1999, now Pat. No. 6,296,096.

(30) Foreign Application Priority Data

May 30, 1998 (DE) .......................................... 198 24 457

(51) Int. Cl.$^7$ ................................................ F16D 35/00
(52) U.S. Cl. ..................... 192/55.6; 192/58.41; 464/24; 464/160
(58) Field of Search .............................. 192/55.2, 55.3, 192/55.4, 55.6, 58.42, 58.41, 208; 464/24, 160

(56) References Cited

U.S. PATENT DOCUMENTS 4,683,998 A * 8/1987 Cigdem et al. .......... 192/58.42
6,102,178 A * 8/2000 Walton ........................ 192/35

* cited by examiner

*Primary Examiner*—Richard M. Lorence

(57) ABSTRACT

A shaft coupling having two attachment elements that are rotatable relative to one another and that are connected to one another by a rotationally resilient assembly, and further having a dampening device which is active between the attachment elements for the purpose of suppressing torsional vibrations of the rotationally resilient assembly is disclosed. The rotationally resilient assembly comprises two ramp discs that are rotatable relative to one another and that support one another at least indirectly. One disc is supported in a rotationally fixed and rigid manner on one of the attachment elements and the other disc is supported in a rotationally fixed and axially resilient manner on the other one of the attachment elements by a spring. The dampening device is a viscous coupling having a hub connected to one of the attachment elements and a housing connected to the other one of the attachment elements.

4 Claims, 5 Drawing Sheets

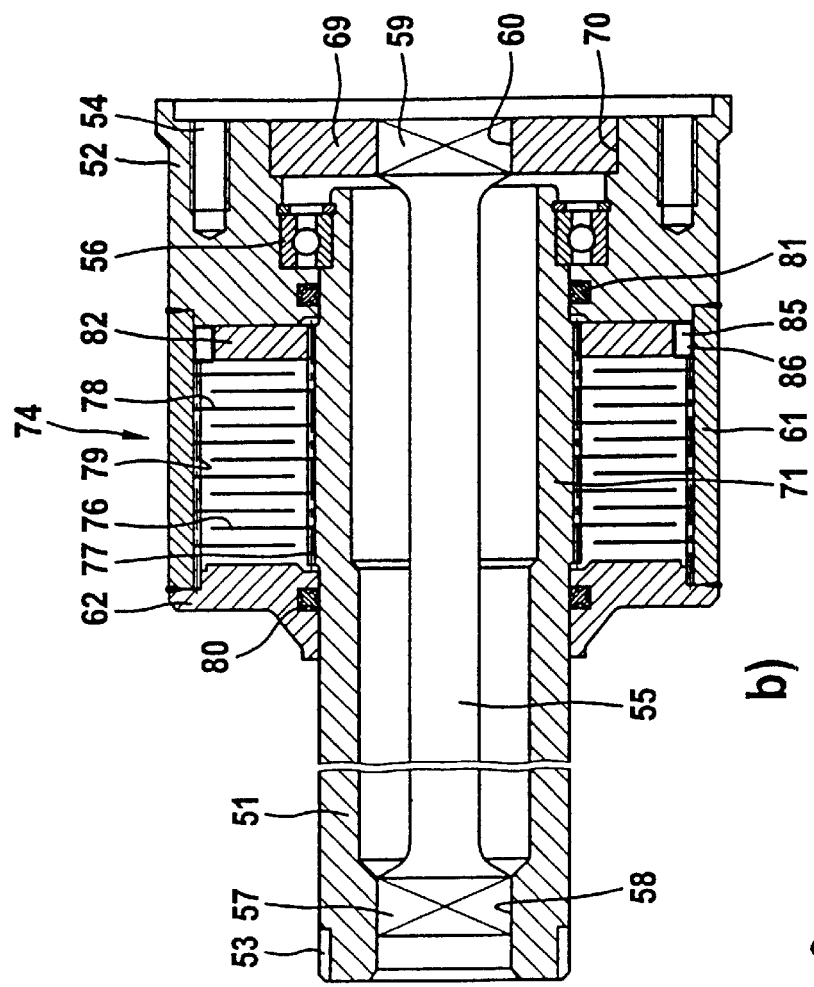
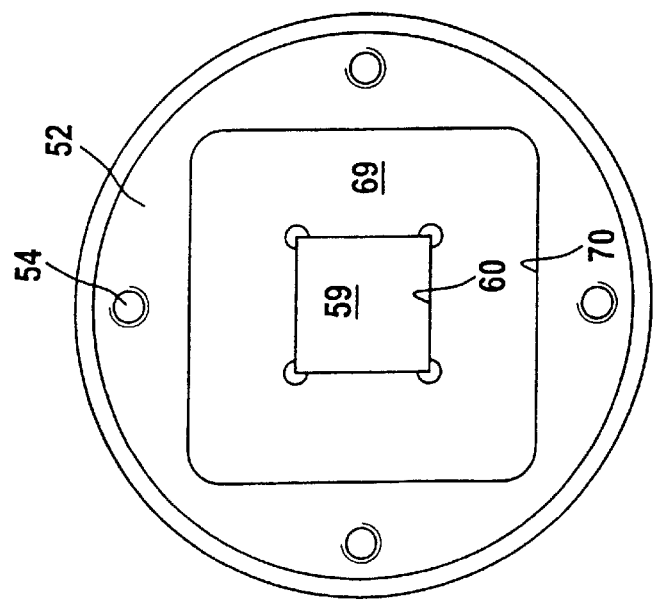
Fig. 3 spring curves

SHAFT COUPLING WITH A DAMPENING DEVICE

This is a divisional application of the prior application Ser. No. 09/320,293 filed May 26, 1999 and is now U.S. Pat. No. 6,296,096B1 which issued on Oct. 2, 2000.

BACKGROUND OF THE INVENTION

The present invention relates to a shaft coupling having two attachment elements that are rotatable relative to one another and that are connected to one another by rotationally resilient assembly, and further having a dampening device which is active between the attachment elements for the purpose of suppressing torsional vibrations of the rotationally resilient assembly.

In the drivelines of motor vehicles there occur torsional vibrations which, especially in high-performance vehicles and four wheel drive vehicles, cannot be suppressed by conventional vibration dampening means at the clutch disc. Likewise, vibration dampening means additionally attached to the propeller shaft, for example, resiliently arranged absorber masses, often are not sufficient to prevent such vibrations from occurring.

It is therefore the object of the present invention to provide a shaft coupling that is incorporated into the driveline, has a high torque transmitting capacity and includes a highly effective dampening means.

SUMMARY OF THE INVENTION

According to a first embodiment, the rotationally resilient assembly comprises two ramp discs that are rotatable relative to one another and that support one another at least indirectly. One disc is supported in a rotationally fixed and rigid manner on one attachment element. The other disc is supported in a rotationally fixed and axially moveable manner on the other attachment element by a spring. The dampening device is a viscous coupling having a hub connected to one of the attachment elements and a housing connected to the other one of the attachment elements. The torsion spring and the torsion damper are systematically switched in parallel relative to one another.

In a preferred embodiment, the ramp discs include circumferential grooves having variable depths, in which balls are guided. Each circumferential groove has a deepest point and the depth of the groove decreases symmetrically from the deepest point towards both ends. Furthermore, the circumferential grooves of the discs are preferably arranged opposite one another as are the discs to thereby jointly accommodate a plurality of balls between them. The decrease in the groove depth as a function of the angle of rotation from the deepest point can be linear or progressive.

In a further preferred embodiment the spring comprises a plurality of plate springs. To achieve uniform load conditions, there are preferably provided three circumferentially distributed balls in the respective grooves to permit the ramp discs to rotate relative to one another in a low-friction way. The rotation of the ramp discs, which is converted into compression of the plate spring, can lead to a very high shaft stiffness of the coupling while at the same time achieving a short coupling length. To ensure effective dampening, there is provided a viscous coupling with suitable plates for generating a high dampening effect, i.e. there is provided an assembly which consists of a hub and a housing, which is filled with a highly viscous medium and which carries axially alternatingly arranged plates.

According to a further preferred embodiment, the ramp discs and the plate spring are arranged in the housing of the viscous coupling.

According to a second embodiment the rotationally resilient assembly comprises a torsion bar having one end connected in a rotationally fixed manner to one of the attachment elements and the other end connected in a rotationally fixed manner to the other one of the attachment elements. The dampening device is a viscous coupling whose hub is connected in a rotationally fixed manner to one of the attachment elements and whose housing is connected in a rotationally fixed manner to the other one of the attachment elements. The torsion bar needs to have a certain length because a hub-shaped attachment element can, at the same time, form the hub of the viscous coupling, i.e. as the torsion bar is arranged concentrically inside the viscous coupling, in this case, too, the overall assembly length is relatively small. The assembly has a very simple design. To ensure effective dampening, there is provided a viscous coupling with suitable plates for generating a high dampening effect, i.e. an assembly which consists of a hub and a housing, which is filled with a highly viscous medium and which carries axially alternatingly arranged plates.

According to a preferred embodiment the rotationally resilient assembly furthermore comprises a torsion tube spring arranged concentrically relative to the torsion bar. One end of the torsion tube spring is connected in a rotationally fixed manner to one of the attachment elements and that the other end of the torsion tube spring is freely rotatable relative to the other attachment element up to a limited rotational angle. In this way it is possible, from a certain angle of rotation onwards, to achieve a high degree of torsional stiffness, without the design of the shaft coupling becoming particularly complicated. In this embodiment also, the torsion bar, the torsion tube spring and the viscous coupling are arranged coaxially relative to one another to reduce the length of the assembly.

Preferred embodiments of the invention will be described below in greater detail with reference to the drawings.

BRIEF DESCRIPTION OF THE DRAWINGS

FIG. 2a is a longitudinal cross-sectional view through a shaft coupling having rotary ramps, plate springs and an integrated viscous coupling.

FIG. 2b is a cross-sectional view between the ramp discs along line 2—2 of FIG. 2a.

FIG. 3a is a longitudinal cross-sectional view of a shaft coupling with a torsion bar and a separate viscous coupling.

FIG. 3b is an axial view of FIG. 3a.

DETAILED DESCRIPTION OF THE PREFERRED EMBODIMENT

Figure 1:
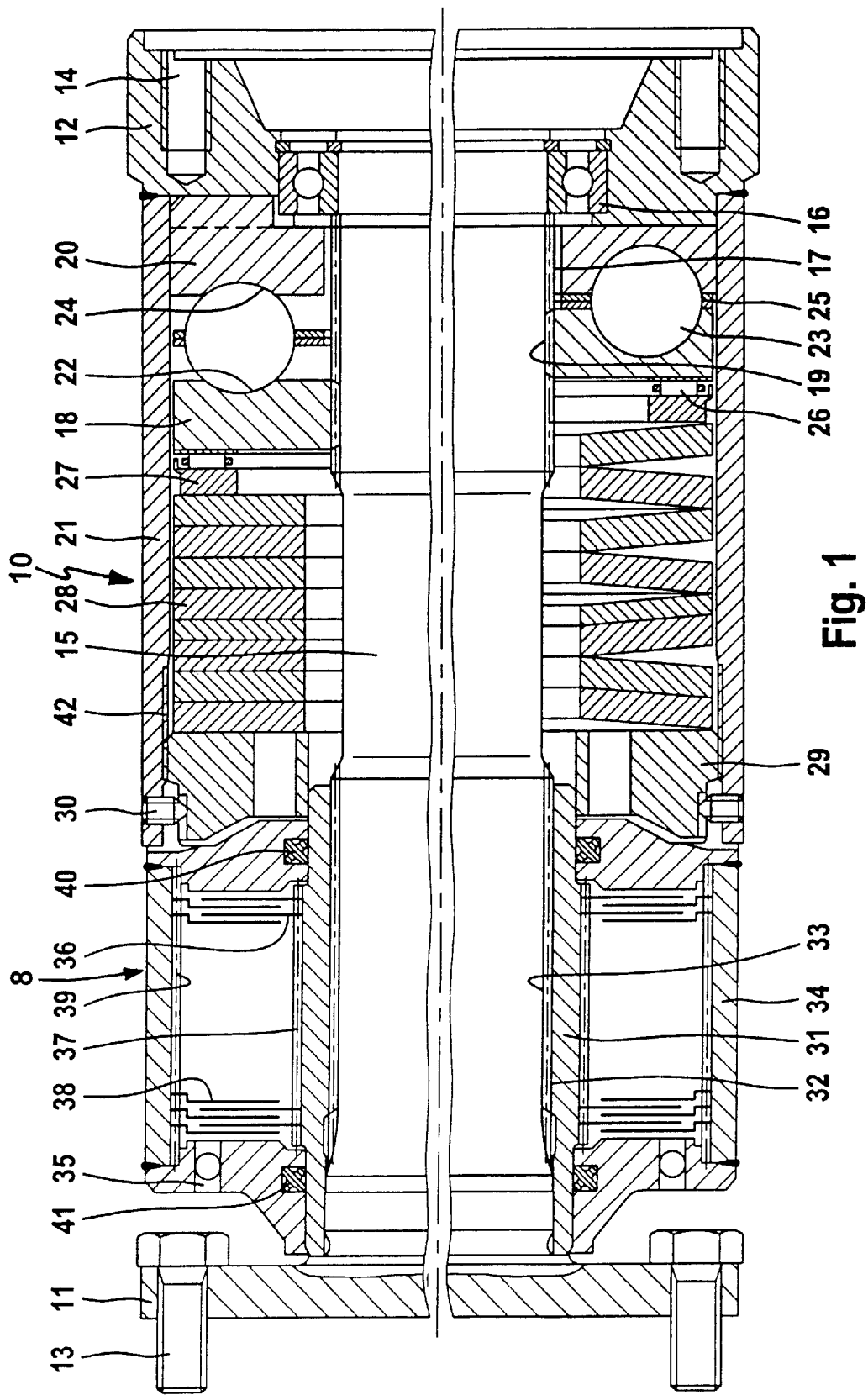
FIG. 1 is a longitudinal cross-sectional view through a shaft coupling having a plate spring, ramp discs and a separately arranged viscous coupling, with the shaft coupling shown in two positions.

In FIG. 1 an inventive shaft coupling is shown generally at 10. Shaft coupling 10 includes a flange 11 which constitutes the first attachment element and a flange 12 constituting the second attachment element. Flange 11 is secured by bolts 13 to a counter flange (not shown). Flange 12 is provided with bolt holes 14 for securing another counter flange (not shown) by means of bolts. To the flange 11 there is secured a substantially torsionally stiff shaft journal 15 which extends into the region of flange 12. A first end 9 of the shaft journal 15 and the flange 12 are rotatably supported relative to one another by a ball bearing 16. At first end 9. the journal 15 includes shaft teeth 17.

A first ramp disc 18, by means of counter teeth 19, engages shaft teeth 17 so as to be rotationally fixed to first end 9 and axially displaceable along shaft journal 15. A second ramp disc 20 is connected to the flange 12 in a rotationally fixed and axially supported manner. Second ramp disc 20 is pressed into a protective tube 21 that is directly welded to flange 12.

First ramp disc 18 includes circumferential grooves 22 whose depth varies across the circumference and which accommodate a plurality of balls 23. Second ramp disc 20 is provided with corresponding circumferential grooves 24 which are symmetrical mirror images of the grooves 22. The plurality of balls 23 are held by a cage 25 so as to be at a constant circumferential distance from one another and aligned with the circumferential grooves (22 and 24). The first ramp disc 18 and The second ramp disc 20 are arranged opposite each other and comprise a rotationally resilient assembly.

First ramp disc 18 is supported by an axial bearing 26 on an axially displaceable pressure ring 27 which is held under pre-tension by a plurality of plate springs 28. Plate springs 28 are supported on a cover 29 which is threaded at the end of the protective tube 21 into a set of internal threads 42. Cover 29 is held so as to be rotationally secured by a plurality of worm screws 30.

When no torque acts on the shaft coupling 10 the balls 23, under the influence of the plate springs 28 acting via the pressure ring 27 and the axial bearing 26 on the first ramp disc 18, assume a neutral position at the deepest point in the base of the circumferential grooves 22, 24, as shown in the lower half of FIG. 1. However, under the influence of torque, the ramp discs 18 and 20 are rotated relative to one another against the force of the plate springs 28, with the balls 23 running into the flatter regions of the circumferential grooves 22, 24 as shown in the upper half of FIG. 1. By rotating the flanges 11 and 12 relative to one another, the ramp discs 18 and 20 can be rotated relative to one another until the plate springs 28 cannot be compressed any further, as shown in the upper half of FIG. 1. Thereafter the shaft coupling 10 is torsion-proof.

The dampening device is in the form of a viscous coupling 8 having a hub 31 arranged on a second set of teeth 32 on the shaft journal 15 by means of a corresponding set of counter teeth 33 on hub 31. A multi-part housing 34 is connected in a rotationally fixed way to the above-mentioned protective tube 21 by means of worm screws 30. The viscous coupling 8 is filled with a viscous medium through a set of bores 35. A plurality of inner plates 36 of the viscous coupling 8 are held on a set of teeth 37 of the hub 31 in a rotationally fixed way. A plurality of outer plates 38 of the viscous coupling 8 are arranged in a rotationally fixed way on a set of inner teeth 39 of the housing 34. The hub 31 and the housing 34 are sealed relative to one another by seals 40, 41.

The movements of the flanges 11 and 12 relative to one another are dampened by the viscous coupling 8 as a result of the corresponding relative movement of the hub 31 connected to the journal 15 and of the housing 34 connected to the protective tube 21, so that any torsional vibrations are thereby suppressed.

Figure 2:
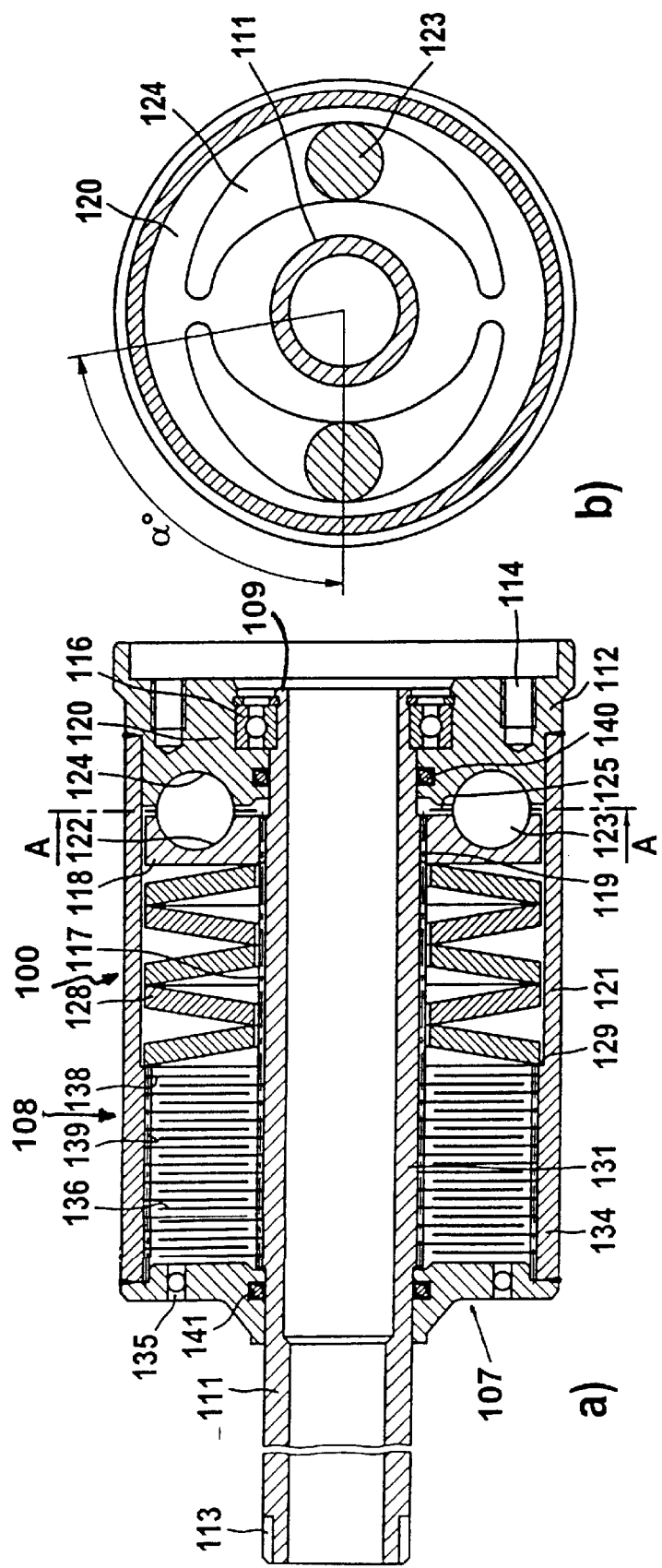

FIG. 2a shows an inventive shaft coupling 100 having a hub 111 constituting the first attachment element and a flange 112 constituting the second attachment element. The hub 111 is connectable to a flange (not shown) by means of a set of teeth 113. The flange 112 is provided with threaded holes 114 for threading on a counter flange (not shown) by means of bolts. Hub 111 is in the form of a substantially torsionally stiff hollow shaft which extends into the region of flange 112.

A first end 109 of the hub 111 and the flange 112 are supported by a ball bearing 116 so as to be rotatable relative to one another. Hub 111 is provided with a set of shaft teeth 117 that engage a set of counter teeth 119 on a first ramp disc 118. Thus, first ramp disc 118 is rotationally fixed and axially displaceable on hub 111. A second ramp disc 120, that is integral with the flange 112, is pressed into a protective tube 121 which is welded directly to the flange 112.

The first ramp disc 118 includes circumferential grooves 122 whose depth and width varies across the circumference and which accommodate a plurality of balls 123. The second ramp disc 120 is provided with corresponding circumferential grooves 124 which are symmetrical mirror images of circumferential grooves 122. The plurality of balls 123 are held by a cage 125 so as to be at a constant circumferential distance from one another and aligned with circumferential grooves (122 and 124). The first ramp disc 118 and the second ramp disc 120 are arranged opposite each other and comprise a rotationally resilient assembly.

The first ramp disc 118 is held under pre-tension directly by a plurality of plate springs 128 supported on an inner step 129 formed in the protective tube 121.

When no torque acts on the shaft coupling 100 the balls 123, under the influence of the plate springs 128 acting on the first ramp disc 118, assume a neutral position at the deepest point in the base of the circumferential grooves 122, 124, as shown in FIG. 2a. However, under the influence of torque, the ramp discs 118, 120 are rotated relative to one another against the force of the plate springs 128, with the balls 123 running into the flatter regions of the circumferential grooves 122, 124 as described above for FIG. 1. By rotating the hub 111 relative to the flange 112, the ramp discs 118, 120 can be rotated relative to one another until the plate springs 128 cannot be compressed any further. Thereafter, the shaft coupling 100 is torsion-proof.

The dampening device is in the form of a viscous coupling 108 having a hub 131 formed directly by hub 111 and a multi-part housing 134 comprising the second ramp disc 120, the above-mentioned protective tube 121 and a cover 107. The multi-part housing 134 is thus connected to the flange 112 in a rotationally fixed way. The viscous coupling 108 is filled with a viscous medium through a set of closed bores 135. A set of inner plates 136 of the viscous coupling 108 are held in a rotationally fixed way on the shaft teeth 117 of the hub 111. A set of outer plates 138 of the viscous coupling 108 are arranged in a rotationally fixed way on a set of inner teeth 139 of the protective tube 121. The hub 111 and the housing 134 are sealed relative to one another by seals 140, 141. Movements of the hub 111 relative to the flange 112 are dampened by the corresponding relative movements of the inner plates 136 relative to the outer plates 138, so that torsional vibrations are suppressed.

In FIG. 2b it is possible to see the circumferential grooves 124 which extend in a symmetrically constant, circular-arch-shaped way and become narrower and shallower from their deepest point toward their ends. FIG. 2b also shows the balls 123 in their deepest position in circumferential grooves 124.

FIG. 3a shows an alternative embodiment having a first attachment element in the form of a hub 51 and a second attachment element in the form of a flange 52. The hub 51 carries a set of outer teeth 53 which are connectable to a flange (not shown). The flange 52 includes threaded holes 54 for threading on a counter flange (not shown). The end of the hub 51 positioned opposite the outer teeth 53 and the flange 52 are rotatably supported relative to one another by a ball bearing 56.

The hub 51 and the flange 52 are rotationally resiliently connected to one another by a torsion bar 55 which has a first square end 57 that directly engages a square opening 58 in the hub 51 and a second square end 59 that engages a square opening 60 in an intermediate plate 69. The intermediate plate 69, in turn, is externally square and engages a corresponding square inner aperture 70 of the flange 52.

The hub 51 is integral with a hub 71 of a viscous coupling 72 which carries a set of inner plates 76 on a set of outer teeth 77. The flange 52, an outer tube 61 and a cover 62 form a housing 74 of the viscous coupling 72. Housing 74 includes a set of inner teeth 79 that hold a set of outer plates 78 of the viscous coupling 72. The housing 74 and the hub 71 are sealed relative to one another by seals 80, 81.

When the hub 51 rotates relative to the flange 52 under torsion of the torsion bar 55, the housing 74 of the viscous coupling 72 simultaneously rotates relative to the hub 71 of same, so that any rotational vibrations of the torsion bar 55 are dampened. At one end, the hub 71, on the outer teeth 77, carries a stop disc 82 which, with rotational play, engages circumferential recesses 86 in the outer tube 61 with stop cams 85. Only after the torsion bar 55 has rotated by a certain angle, do the stop cams 85 become effective and limit the rotation.

Figure 4:
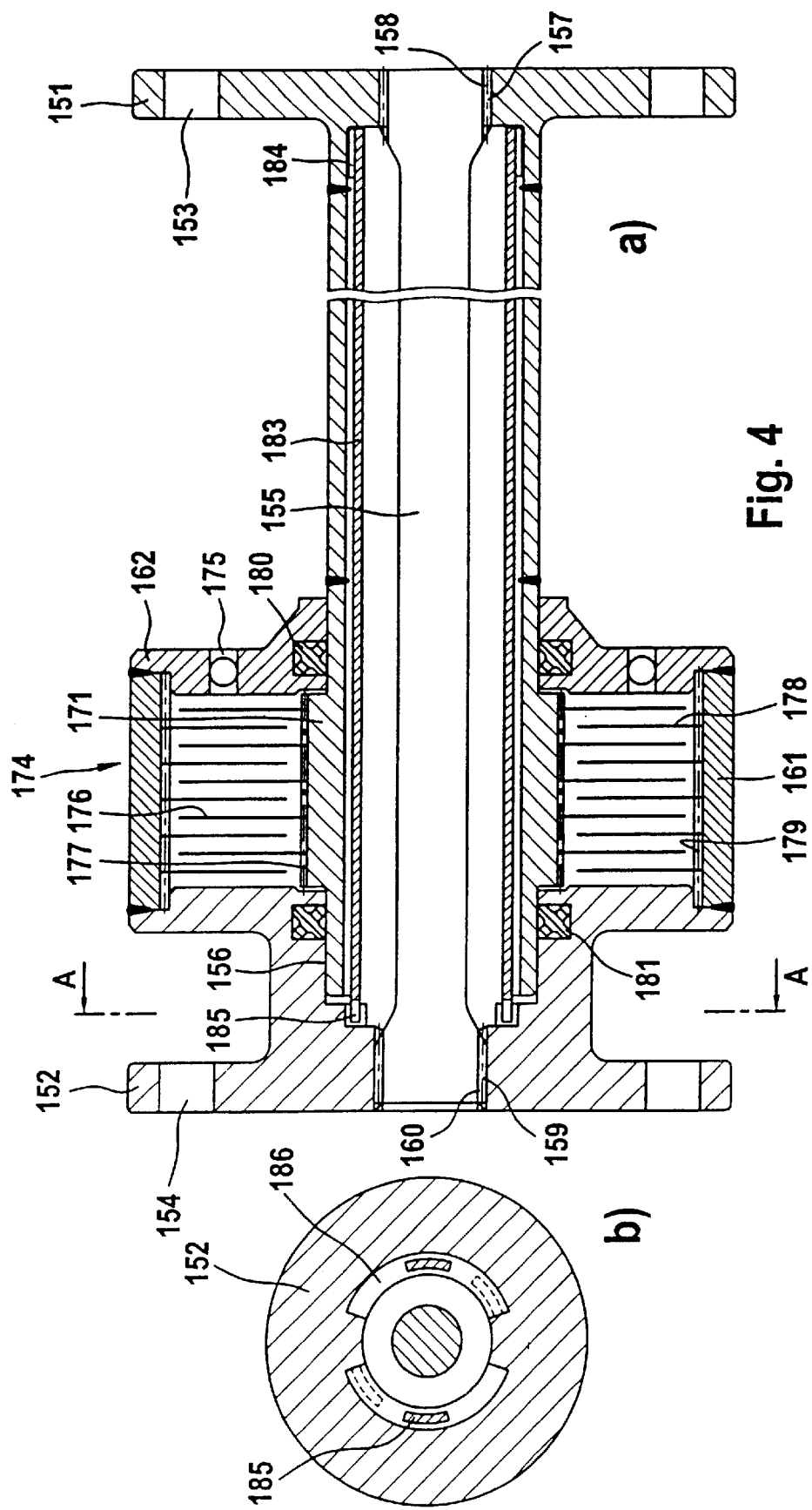
FIG. 4a is a longitudinal cross-sectional view of a shaft coupling with a torsion bar and an additional tube spring along with a viscous coupling.
FIG. 4b is a cross-sectional view along line 4—4 of FIG. 4a through the end of the tube spring.

FIG. 4a shows an alternative embodiment having a first attachment element in the form of a flange 151 and a second attachment element in the form of a flange 152. The flange 151 is provided with bolt holes 153 for threading on a first counter flange (not shown). The flange 152 is provided with bolt holes 154 for threading on a second counter flange (not shown). The flange 151 is connected in a rotationally fixed way to a hub 171. The end of the hub 171 positioned opposite flange 151 and flange 152 are rotationally supported relative to one another by a friction bearing 156.

The flange 151 and the flange 152 are rotationally resiliently connected to one another by a torsion bar 155 having a set of teeth 157 on one end that directly engage a set of inner teeth 158 in the flange 151 and a set of second teeth 159 at the other end that directly engage a set of teeth 160 of the flange 152.

Inside the hub 171 there is concentrically arranged a rotary tube spring 183 which is directly secured to the flange 151 at one end by driving elements 184 but which, otherwise, is positioned at a radial distance between the hub 171 and the torsion bar 155. At the opposite end of the tube spring 183 there are provided stop elements 185 which, with rotational play, engage circumferential slots 186 in the flange 152. Only after the torsion bar 155 has been rotated by a certain angle do the stop elements 185 become effective, with the tube spring 183 becoming active in addition to the torsion bar 155. The hub 171 directly forms the hub of a viscous coupling 200. A set of outer teeth 177 on hub 171 carries a set of inner plates 176. The flange 152 is connected to a housing 174 of the viscous coupling 200. Housing 174 is formed by the flange 152, an outer tube 161 and a cover 162. Housing 174 includes inner teeth 179 that carry a set of outer plates 178 of the viscous coupling 200. The housing 174 and the hub 171 are sealed relative to one another by seals 180, 181.

When the flange 151 rotates relative to the flange 152 under the influence of torsion of the torsion bar 155 and, possibly, relative to the tube spring 183, the housing 174 of the viscous coupling 200 rotates simultaneously relative to the hub 171, so that any rotational vibrations of the torsion bar 155 and, possibly, of the tube spring 183 are dampened.

FIG. 4b shows a cross-sectional view along line 4—4 of FIG. 4a.

Figure 5:
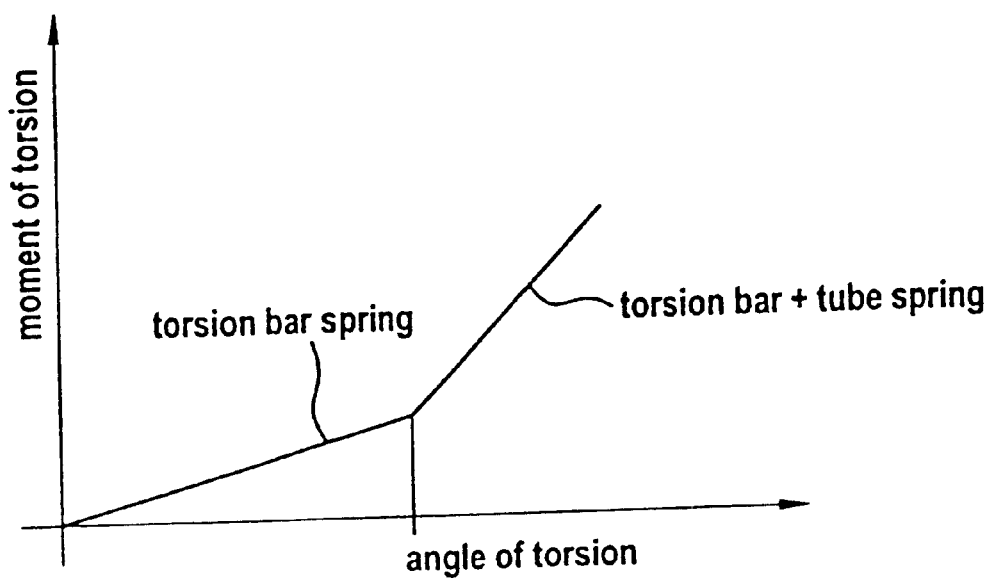
FIG. 5 is a graph of the characteristic spring curve of the shaft coupling designed according to FIGS. 4a and 4b.

FIG. 5 shows a graph of the characteristic spring curve of the viscous coupling 200 designed according to FIGS. 4a and 4b, which, up to an angle of rotation $\alpha 1$, due to the sole function of the torsion bar 155 resilience extends linearly with a first flatter inclination and which, above the angle of rotation $\alpha 1$, due to the joint effect of the torsion bar 155 resilience and the tube spring 183, extends linearly with a second steeper inclination.

I claim:

1. A shaft coupling comprising:

a first attachment element and a second attachment element that are rotatable relative to one another and that are connected to one another by a rotationally resilient assembly. and a dampening device that is active between said first and said second attachment elements for the purpose of suppressing torsional vibration of said rotationally resilient assembly;

said rotationally resilient assembly comprising a first ramp disc and a second ramp disc (18, 20, 118, 120) that are rotatable relative to one another and that support one another at least indirectly;

one of said first and said second ramp discs supported in a rotationally fixed and rigid manner on one of said first and said second attachment elements and the other of said first and said second discs supported in a rotationally fixed and axially resilient manner on the other of said first and said second attachment elements by a spring (28, 128); and said dampening device comprising a viscous coupling having a hub (31, 131) connected to one of said first and said second attachment elements and a housing (34, 134) connected to the other of said first and said second attachment elements.

2. A shaft coupling as recited in claim 1, wherein said first and said second amp discs each includes circumferential grooves (22, 24, 122, 124), said circumferential grooves having a variable depth along their length and said circumferential grooves receiving a plurality of balls (23, 123) guided by said circumferential grooves.

3. A shaft coupling as recited in claim 1, wherein said spring comprises a plate spring.

4. A shaft coupling as recited in claim 1, wherein said first and said second ramp discs and said spring is arranged in said housing of said viscous coupling.

* * * * *

UNITED STATES PATENT AND TRADEMARK OFFICE
CERTIFICATE OF CORRECTION

PATENT NO. : 6,484,859 B2
DATED : November 26, 2002
INVENTOR(S) : Chludek

It is certified that error appears in the above-identified patent and that said Letters Patent is hereby corrected as shown below:

<u>Column 6,</u>
Line 41, please insert -- ramp -- between the words "second" and "discs".
Line 51, please delete "amp" and substitute therefor -- ramp --.

Signed and Sealed this

Seventeenth Day of June, 2003

JAMES E. ROGAN
*Director of the United States Patent and Trademark Office*